Jan. 26, 1943.  C. D. YOUNG  2,309,288
MANUFACTURE OF CLAD METAL
Filed Aug. 16, 1940
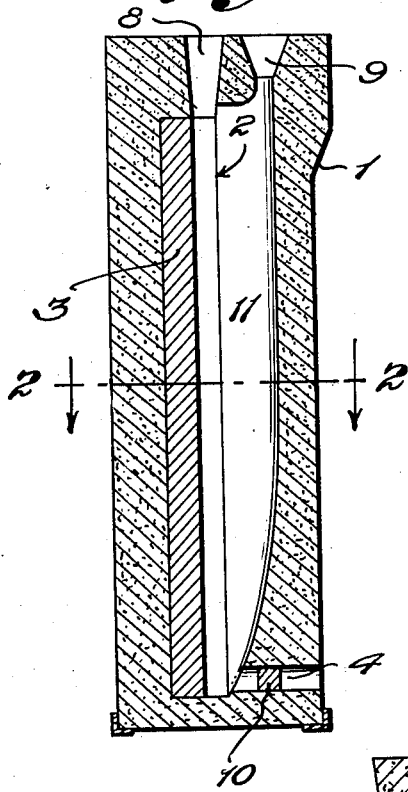
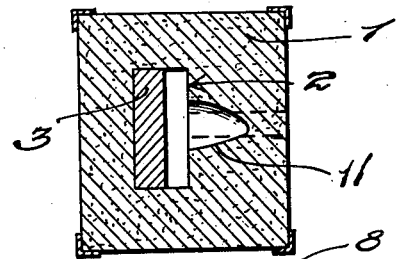
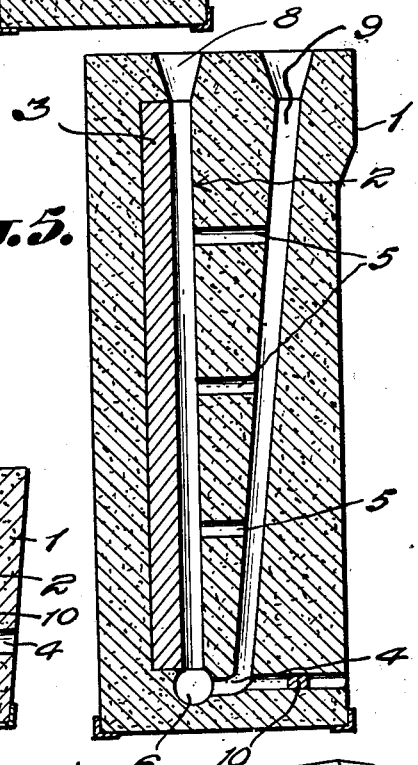
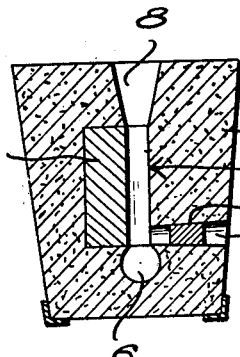
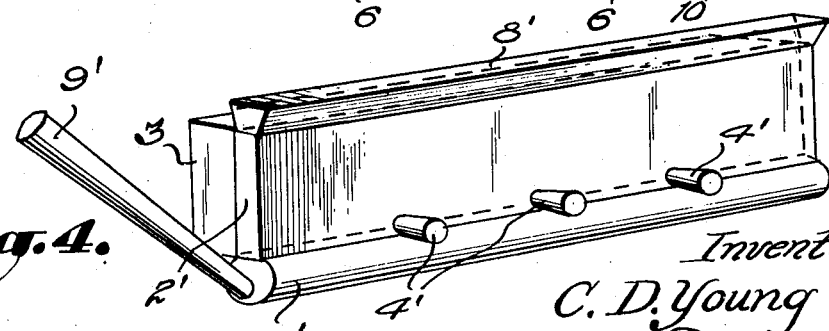
Inventor,
C. D. Young
By: Henry C. Parker
Attorney.

Patented Jan. 26, 1943

2,309,288

UNITED STATES PATENT OFFICE 2,309,288

MANUFACTURE OF CLAD METAL

Charles D. Young, Chicago, Ill.

Application August 16, 1940, Serial No. 352,969

6 Claims. (Cl. 22—204)

This invention relates to manufacture of clad metals; and it comprises a method wherein a high-melting metal layer, such as stainless steel, is cast-welded to a steel base; said method comprising preheating a billet of iron or steel before or after forming a mold around said billet, said mold having a cavity corresponding to the form of the desired cladding metal along at least one face of said billet, then introducing into said mold cavity the cladding metal in the form of a metal superheated to temperatures of the order of at least about 3000° F., the said superheat being derived from a thermit reaction and at least a substantial amount of the molten cladding metal being also derived from said thermit reaction; all as more fully hereinafter set forth and as claimed.

Within the past few years an important demand has developed for clad metals, especially for stainless clad or nickel clad steels. Several different methods of producing these clad metals have been proposed. In one method a so-called "sandwich" is produced by combining a thick billet of carbon steel with a thinner billet of stainless steel. In this method the two meeting surfaces of the billets are carefully cleaned, followed by the sprinkling of a carbon dust over these surfaces. The prepared surfaces are then juxtaposed, the billets are welded together around the edges of the prepared surfaces, thus forming the "sandwich" and then this is heated in a furnace to a temperature as high as possible short of melting, followed by rolling the "sandwich" into sheets which have from about 2 to 10 per cent of cladding metal welded to one surface.

Another method which has been proposed for the manufacture of cladding metals involves a spot welding operation in which a billet of cladding metal is spot welded over its entire surface to a billet of carbon steel. This is, of course, an expensive and laborious operation. It has also been proposed to deposit cladding metal over the entire surface of a billet by the use of a welding electrode, resulting in a deposit having a thickness of approximately ¼ inch, the coated billet being then rolled down.

None of the above described cladding methods have been found to be entirely satisfactory in practice. Most of them are too expensive to be practical and in the others the adherence between the cladding metal and the base metal has left much to be desired.

In the present invention the difficulties described above have been overcome by employing a thermit reaction to supply sufficient superheat to the cladding metal to raise it to a temperature not substantially below 3000° F. and by contacting the steel billet with the molten cladding metal in such manner as to minimize the flow of the cladding metal along the surface of the billet, that is, the molten cladding metal is poured into the mold and the mold is so shaped that chilling of the cladding metal is avoided and that superheated cladding metal is contacted with the entire surface over which welding takes place. During welding the temperature at the interface between the cladding metal and the steel billet should reach temperatures at least within the range of about 2600° to 3000° F. This cannot be accomplished by heating the cladding metal by any of the usual furnace methods, even though the steel billet is preheated to temperatures as high as possible before the welding step. In the present welding method it is important that the steel billet be preheated either before it is placed in a preformed mold or after a mold has been formed around it.

My invention can be adapted to the cladding of thick billets of steel with thinner layers of various cladding metals. Stainless steels containing 18 per cent chromium and 8 per cent nickel, 25 per cent chromium and 20 per cent nickel, or 25 per cent chromium and 12 per cent nickel can be used as cladding metals for example. Pure nickel can also be clad on steel by my method. It is likewise possible to employ Monel metal (Ni. 65–70%; Cu, 26–30% and Fe, less than 3%) and Inconel (Ni, 80%; Cr, 14% and Fe, 6%). All of these metals are, of course, more expensive than iron or steel. But it may be stated that all metals and alloys that can be produced by a thermit reaction can be satisfactorily welded by my process.

There are several different ways of supplying the necessary superheat to the cladding metal. It is possible, for example to melt the cladding metal in a crucible in a furnace and then to superheat by the addition of a thermit, such as an iron thermit, for example, the reaction being preferably conducted beneath the surface of the melt. If a stainless steel is to be used as the cladding metal and an iron thermit is used to supply the superheat it is obvious, of course, that the chromium and nickel contents of the stainless steel will be diluted by the iron derived from the alumino-thermic reaction. But it is possible to employ a stainless steel having a somewhat higher content of chromium and nickel than that desired in the cladding metal, relying upon the iron derived from the reaction to dilute the stainless steel to the desired point. It is also possible to employ a nickel thermit to supply the necessary superheat or a mixed nickel-chromium or nickel-chromium-iron thermit. These thermits will supply nickel, a mixture of nickel and chromium or a mixture of nickel, chromium and iron, respectively, to the cladding metal. It is therefore evident that it is possible to produce molten cladding metals having a wide range of compositions and having the desired superheats within the scope of the present invention.

A more advantageous method of conducting the process of the present invention is to employ the alumino-thermic metal per se as the cladding metal, that is, the metal resulting directly from the reaction of a thermit adapted to produce a thermit metal of the desired composition. A wide range of thermits can be compounded which are useful for the production of suitable cladding metals. If this method is employed, the superheat present in the cladding metal may be increased substantially. In fact the temperatures of the molten metals derived from such thermit reactions usually range from about 4000° to 5000° F. When thermit metals are employed as cladding metals, therefore, the preheating of the steel billets to which the cladding metals are applied is not as difficult, since the high superheat in the cladding metal ensures that the interface over which welding takes place will reach welding temperatures. In fact I have found that the steel billet requires preheating only to temperatures within the range of about 1000° to 1500° F., which is relatively easy to accomplish. It is also not necessary to employ a melting furnace if the thermit metal itself is employed as a cladding metal. Metals, such as chromium, nickel, copper, vanadium, manganese, etc., may be incorporated in the thermit used in producing the molten cladding metal and these metals, of course, are then present in the melt. Various mixed thermits may be employed to produce particular alloying compositions as will be understood by those skilled in this art.

My invention can be explained in somewhat greater detail by reference to the accompanying drawing which shows, more or less diagrammatically, two molds which can be used in my cladding process and a rough casting produced in this process. In this showing:

Fig. 1 is a vertical section through a billet standing on its end and enclosed by a mold which can be used for cladding one face thereof, Fig. 2 is a horizontal section of the billet and mold shown in Fig. 1, taken along the line 2—2, Fig. 3 is a vertical section through a billet standing on its edge and enclosed by a mold which is suitable for cladding one face thereof, Fig. 4 is a view in perspective of a rough casting of clad metal welded to a billet, as produced by the mold shown in Fig. 3, while Fig. 5 is a vertical section through a billet standing on its end and enclosed by a modified mold.

In the various figures, like parts are indicated by like reference numerals. The mold proper is shown at 1 while the mold cavity proper is shown generally at 2, this cavity having a vent 8. The billet which is to be clad is shown at 3. The mold cavities and cladding metals in the various figures of the drawing have been increased in thickness, in comparison with the dimensions which would be used in practice, in order to increase the clarity of the showing.

The molds used in this invention are usually provided with one or more preheating gates 4 at the bottom in order to enable the billets to be preheated while in the mold. Otherwise it is necessary to preheat the billets in a furnace and then to slip them into a preformed mold.

It will be noted that the mold of Figs. 1 and 2 is provided with what is usually called a "fin" pouring gate 11 and a pouring channel 9. The function of the fin pouring gate is to introduce the molten cladding metal while at its maximum temperature first into the mold cavity at its lower end without previously contacting the relatively cold billet, then, as the mold cavity becomes filled, to direct the melt directly against the billet at progressively higher points without previous contact with the billet and with the production of the least possible flow of the melt along the surface of the billet. This prevents chilling of the clad metal below welding temperatures and the washing away of the metal of the billet. It is important that the melt be introduced into the mold cavity in this or an equivalent manner in all cases in which the vertical height of the billet in the mold is of the order of 24 inches or more, since the flow of cladding metal along the billet at any point should not exceed a distance of about 24 inches. A modified method of preventing any substantial flow of metal along the surface of the billet is shown in Fig. 5. In the mold shown in this figure the pouring channel 9 is connected to the mold cavity proper 2 by means of the horizontal connecting gates 5, which are positioned from about 18 to 24 inches apart vertically, and also by the horizontal pouring gate 6 which extends along the bottom of the mold cavity. When the thermit metal is introduced into the pouring channel 9 it first falls to the bottom of this channel and flows into the pouring gate 6, rising vertically into the mold cavity until the lowest connecting gate 5 is reached. The bulk of the metal then passes through this connecting gate while it rises in the mold cavity to the next higher connecting gate, etc. It is evident therefore that the connecting gates 5 perform the same function as the fin pouring gate of Fig. 1 in progressively preventing any substantial flow of cladding metal along the surface of the billet.

It will be noted that the billet shown in the molds of Figs. 1, 2 and 5 is standing on its end. This billet may have dimensions of 5 feet in length by 1 foot in width and 3 inches in thickness, for example. The cladding metal may have a thickness of approximately ¼ inch or it may amount to from about 2 to 10 per cent of the billet. It is also possible to clad the face of a billet having dimensions of this order while lying on its side. In this case it is possible to employ a plurality of fin pouring gates along the length of the billet, having somewhat the shape of that shown in Fig. 1, or a plurality of pouring channels provided with connecting gates, as shown in Fig. 5. In order to prevent the molten cladding metal from flowing along the billet, it is important that such fin pouring gates or pouring channels be spaced not further apart than about 2 feet. However, a better method of cladding the billet while lying on its side is illustrated in Figs. 3 and 4.

The pouring gate 6 used in the mold of Fig. 3 passes horizontally along the billet just beneath the mold cavity 2. The complete structure of the mold used will be evident from Fig. 4 which shows a billet 3 welded to a rough casting of cladding metal. The rough casting, of course, shows the shape of the mold cavity, the pouring gate, the pouring channel and the vent. These parts of the casting are designated by primed reference numerals which are the same as those which designate the corresponding parts of the mold in the other figures. That is, the slab of cladding metal which corresponds to the shape of the mold cavity 2 is designated in Fig. 4 by the numeral 2', etc. It will therefore be seen that the pouring channel of the mold used in producing the casting of Fig. 4 is connected to the pouring gate 6 at one end and corresponds in shape and position to the casting part shown in Fig. 4 at 9'. During the pouring operation the preheating gates 4 are plugged, as indicated at 10 in Fig. 3 but these gates produce corresponding projections 4' on the rough casting. The vent 8 of the mold produces the casting part 8', while the pouring gate 6 produces the part 6' of the casting. The casting parts 9', 6', 4', and 8' are, of course, trimmed off before the clad billet is rolled.

If the billet is preheated in a furnace and then slipped into the mold to be clad, it is necessary that the mold used be skin-dry or partially baked before use. The mold must be so shaped that the billet can be readily introduced into the mold when in heated condition. This method of preheating has the advantage of being more efficient and thorough.

It will be noted that the molten cladding metal, when introduced into the mold of Fig. 3 flows from the pouring gate 6 upwardly along the face of the billet for a distance of about 12 inches before reaching the top of the billet. A considerable amount of cooling takes place owing to the heat lost to the billet but if a substantial vent 8 is left at the top of the mold, any metal which has been cooled below welding temperatures collects in this vent and therefore a perfect weld is obtained. The greater the billet surface over which the cladding metal flows, the greater the volume which should be provided in the vent. But, as stated previously, the molten cladding metal should not flow over the surface of the billet for a distance substantially exceeding 18 to 24 inches since otherwise it is likely to be cooled to the point at which a perfect weld is impossible.

In a practical embodiment of this invention I made up a special thermit containing 15 parts of iron thermit, 3 parts of chromium metal and 1½ parts of a nickel thermit. Upon ignition in a magnesite lined, bottom-tapped crucible by the use of an ignition powder, this special thermit mixture produced in 30 seconds a molten cladding metal having a temperature of about 4000 F. containing about 18 per cent chromium and 8 per cent nickel. This superheated melt was introduced into a mold cavity extending across the face of a carbon steel billet which had been preheated to a temperature of about 1500 F. Upon cooling the billet was clad with a stainless steel of the composition stated, the weld between the face of the billet and the cladding metal being perfect.

In another operation I produced a billet clad with nickel by the use of a nickel thermit in which the reacting ingredients were mixed in the molecular proportions indicated in the following equation of reaction:

$$3NiO + 2Al = Al_2O_3 + 3Ni$$

This thermit was found to produce a melt of nickel having a temperature of about 5000° F. which was cast welded to a black iron billet preheated to a temperature of the order of 1000° F.

In still another operation I produced in the crucible of a furnace a melt of stainless steel containing 25 per cent of chromium and 15 per cent nickel. This melt was superheated by reacting an iron thermit beneath the surface thereof. 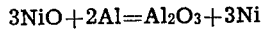 This iron thermit was packed together with an ignition powder in a metal can and polled beneath the surface of the melt during the thermit reaction. Sufficient iron thermit was employed to produce a resultant composition in the melt corresponding to about 18 per cent chromium and 8 per cent nickel. This was sufficient to raise the temperature of the melt to about 3800° F. This superheated melt was poured into a mold cavity extending across one face of a steel billet which had been preheated to a temperature of about 2000° F. It was found that a perfect weld between the billet and the stainless steel cladding metal was formed in this way.

In compounding thermits for use in my process, the quantity of aluminum to be employed is judged empirically and should be only sufficient to produce a trace of aluminum in the final product. The thermit metal produced upon reaction of such thermits is usually within the temperature range of about 4000° to 5000° F., depending upon the heats of reaction of the various components of the thermit, etc. The temperature of the melt can be reduced by introducing a metal powder into the thermit. A pure nickel thermit, for example, is so reactive that it is advantageous to incorporate from about 10 to 15 per cent of nickel shot in the composition. It is also usually possible to raise the temperature of the melt by suitable choice of the components of the thermit. In the case of the thermit described in the first specific example, the metallic chromium can be replaced by corresponding amounts of chromium oxide and aluminum. This substitution substantially increases the temperature of the stainless steel melt formed.

The temperature of the melt of cladding metal and of the preheated billet are to some extent reciprocal, that is, the higher the temperature of the melt the lower the temperature to which the billet must be preheated to produce the desired cast welding. These temperatures vary, of course, with the composition of the cladding metal as well as with the composition of the billet. When billets of iron or steel are to be clad with stainless steel or nickel, the temperature of the superheated melt of cladding metal should be within the range of about 3000° to 5000° F. while the temperature of the preheated billet is within the range of 1000° to 2000° F., the higher temperatures of the melt being employed with the lower temperatures of the billet, within the ranges stated. The interface between the molten cladding metal and the billet must at least reach welding temperatures which, for the metals and alloys within the present invention are not substantially below about 2600° F. The upper limit to the temperatures which should be reached at the interface is determined by the melting point of the metal of the billet, that is, the temperature of the cladding metal and also the temperature at the interface should be below those causing any substantial melting of the billet.

While I have described what I consider to be the most advantageous embodiments of my process it is obvious, of course, that the specific procedures described can be varied to a considerable extent without departing from the purview of this invention. Thus, while I have described the cladding of iron and carbon steel billets, it is obvious that my process is also adapted to the cladding of other high-melting metals, such as copper and its high-melting alloys, for example.

My process is adapted to the cladding of metals with a wide range of metals and alloys since, as mentioned previously, any metal which can be produced by the thermit reaction can be used as a cladding metal. And other high-melting metals which require to be superheated, that is, heated above their melting points, in order to be cast welded, can be used in my process as cladding metals, since the required superheat can be supplied by the thermit reaction by reacting a thermit metal beneath the surface of such metals when in the molten state.

It is obvious, of course, that the billet which is clad by my method can be rolled out to a sheet directly from the welding heat or it may be cooled and subsequently reheated before rolling. One or both faces or the entire outside surface of a billet can be clad by my method. Other modifications which fall within the scope of the following claims will be immediately evident to those skilled in this art.

What I claim is:

1. In the cladding of thick billets of iron and steel with relatively thin layers of stainless steel, the process which comprises melting a stainless steel containing a quantity of chromium and nickel which is greater than that desired in the cladding metal, reacting an iron thermit beneath the surface of the melt in such quantity that the iron produced by the thermit reaction will dilute the content of chromium and nickel to the desired stainless composition, sufficient thermit being used to produce a resulting temperature not substantially below 3000° F., and then pouring the resulting superheated melt into contact with a preheated billet to be clad in such fashion that at least one face of the billet is contacted with a relatively thin layer of the melt having a thickness amounting to from about 2 to 10 per cent of the thickness of the billet and while the melt still has superheat, thereby cast welding said stainless steel layer to said billet.

2. In the cladding of thick billets of iron and steel with relatively thin layers of stainless steel, the process which comprises forming a melt of stainless steel cladding metal superheated by means of a thermit reaction to within the temperature range of about 3000° to 5000° F., and contacting at least one face of such a billet with a relatively thin layer of said molten stainless steel having a thickness amounting to from about 2 to 10 per cent of the thickness of the billet, the billet being preheated within the range of about 1000° to 2000° F., the higher temperatures within the first named range being used with the lower temperatures in said second named range.

3. In the cladding of billets of ferrous metal with high-melting metals, the process which comprises forming a mold about a billet of ferrous metal, said mold being provided with a mold cavity having a width amounting to from about 2 to 10 per cent of the thickness of the billet, preheating the billet to temperatures within the range of about 1000° to 2000° F., then introducing into said cavity a molten cladding metal selected from a class consisting of stainless steel, nickel and an alloy of nickel and copper, said molten metal being introduced into said mold cavity in such fashion that the molten metal is directed against the billet at points progressively higher as the mold cavity fills without substantial previous contact with the billet and with a minimum flow of the metal along the face of the billet, said molten metal having been previously superheated to temperatures within the range of about 3000° to 5000° F. by means of heat generated by a thermit reaction, the higher billet preheat temperatures being employed with the lower temperatures of the molten cladding metal, thereby producing cast welding of said cladding metal to said billet.

4. In the process of cladding metal billets with molten metals and alloys in which a temperature of at least about 2600° F. is required at the interface between the billet and the molten metal to produce cast welding, the steps which comprise forming a mold about a billet of a ferrous metal, said mold being provided with a relatively thin mold cavity extending along at least one face of said billet having a thickness amounting to from about 2 to 10 per cent of the thickness of the billet and with a fin pouring gate, preheating the billet to a temperture within the range of about 1000° to 2000° F., then introducing molten cladding metal of high melting point, selected from a class consisting of stainless steel, nickel and an alloy of nickel and copper, into said mold through said pouring gate at a temperature within the range of about 3000° to 5000° F., the higher billet temperatures being employed with the lower temperatures of the molten cladding metal, the fin pouring gate being so constructed and arranged that the flow of cladding metal along the surface of the billet for a distance substantially exceeding about 24 inches is prevented.

5. In the cladding of metals, the process which comprises forming a mold about a billet of a ferrous metal, said mold being provided with a mold cavity adjacent the billet having a thickness amounting to from about 2 to 10 per cent of the thickness of the billet, a pouring channel and connecting gates joining the pouring channel with said mold cavity, preheating said billet to temperatures within the range of about 1000° to 2000° F., then introducing a molten cladding metal of high melting point, selected from a class consisting of stainless steel, nickel and an alloy of nickel and copper, into said mold cavity through said pouring channel and connecting gates, said molten cladding metal having been superheated within the temperature range of about 3000° to 5000° F. by means of the heat generated by a thermit reaction, the higher billet temperatures being employed with the lower temperatures of the molten cladding metal, said pouring channel and connecting gates being so constructed and arranged that there is no substantial flow of molten cladding metal along the surface of the billet.

6. In the cladding of thick billets of iron and steel with relatively thin layers of nickel, the process which comprises forming a melt of nickel cladding metal superheated by means of a thermit reaction to within the temperature range of about 3000° to 5000° F. and contacting at least one face of such a billet with a relatively thin layer of said molten nickel having a thickness amounting to from about 2 to 10 per cent of the thickness of the billet, the billet being preheated within the range of about 1000° to 2000° F., the higher temperatures within the first named range being used with the lower temperatures in said second named range.

CHARLES D. YOUNG.